US009109679B2

United States Patent
Carey et al.

(10) Patent No.: US 9,109,679 B2
(45) Date of Patent: Aug. 18, 2015

(54) TOROIDAL TRACTION DRIVE TRANSMISSION

(71) Applicant: GM Global Technology Operations LLC, Detroit, MI (US)

(72) Inventors: Clinton E. Carey, Highland, MI (US); Daryl A. Wilton, Macomb, MI (US); James M. Hart, Belleville, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 83 days.

(21) Appl. No.: 13/866,229

(22) Filed: Apr. 19, 2013

(65) Prior Publication Data

US 2013/0303325 A1    Nov. 14, 2013

Related U.S. Application Data

(60) Provisional application No. 61/644,821, filed on May 9, 2012.

(51) Int. Cl.
*F16H 37/08* (2006.01)
*F16H 37/02* (2006.01)

(52) U.S. Cl.
CPC ........ *F16H 37/022* (2013.01); *F16H 2037/023* (2013.01)

(58) Field of Classification Search
CPC ........................................... F16H 37/02
USPC ........................................ 475/214, 207, 216
See application file for complete search history.

(56) References Cited

U.S. PATENT DOCUMENTS

| | | | | |
|---|---|---|---|---|
| 5,401,221 A    * | 3/1995  | Fellows et al.       | 475/214 |
| 2002/0128110 A1* | 9/2002  | Shibukawa            | 475/214 |
| 2003/0060318 A1* | 3/2003  | Sumi                 | 475/216 |
| 2006/0234823 A1* | 10/2006 | Inoue                | 475/216 |
| 2013/0130859 A1* | 5/2013  | Lundberg et al.      | 475/214 |
| 2013/0210569 A1* | 8/2013  | Heitzenrater et al.  | 475/214 |

* cited by examiner

*Primary Examiner* — Ramya Burgess
*Assistant Examiner* — Lillian Nguyen

(57) ABSTRACT

A continuously variable transmission includes a gearbox with a forward mode and a reverse mode. The gearbox includes a plurality of gear members and further includes at least two torque transmitting devices such as, a clutch and a brake that are selectively employed to engage various combinations of the gear members such that a particular combination is associated with one of the forward mode and the reverse mode.

17 Claims, 1 Drawing Sheet

TOROIDAL TRACTION DRIVE TRANSMISSION

CROSS-REFERENCE TO RELATED APPLICATIONS

Figure 1:
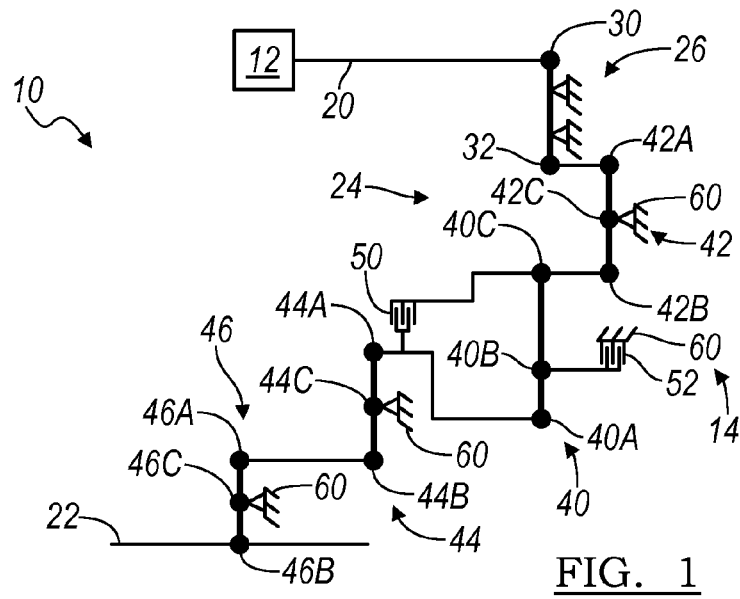

This application claims the benefit of U.S. Provisional Application No. 61/644,821 filed May 9, 2012. The disclosure of the above application is incorporated herein by reference.

FIELD

The present invention relates to continuously variable transmissions. More specifically, the present invention relates to continuously variable transmissions with a forward and reverse mode.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes integrally formed gear teeth that are in mesh with and drive a corresponding gear. The gear in turn is functionally coupled to an output shaft or layshaft that is functionally coupled to the final drive unit.

SUMMARY

A continuously variable transmission includes a gearbox with one forward mode and a reverse mode. The gearbox includes a plurality of gear members and further includes at least two torque transmitting devices such as, a clutch and a brake that are selectively employed to engage various combinations of the gear members such that a particular combination is associated with one of the forward mode and the reverse mode.

In an embodiment of the present invention the continuously variable transmission includes: an input shaft, an output shaft, a variator, a first transfer gear set, a planetary gear set assembly, a friction brake, a second transfer gear set and a friction clutch.

In another embodiment of the present invention, the variator has an input coupled to and driven by the input shaft and an output.

In still another embodiment of the present invention, the first transfer gear set has a first gear coupled to and driven by the output of the variator and a second gear.

In still another embodiment of the present invention, the planetary gear set assembly has a sun gear, a planet gear carrier having a plurality of meshing planet gears and a ring gear.

In still another embodiment of the present invention, the friction brake is configured to selectively couple the planet gear carrier of the planetary gear set assembly to a stationary member.

In still another embodiment of the present invention, the second transfer gear set has a first gear coupled to the sun gear of the planetary gear set assembly and a second gear operably driving the output shaft.

In still another embodiment of the present invention, a friction clutch is selectively engageable to interconnect the second gear of the first transfer gear set with sun gear of the planetary gear set assembly.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
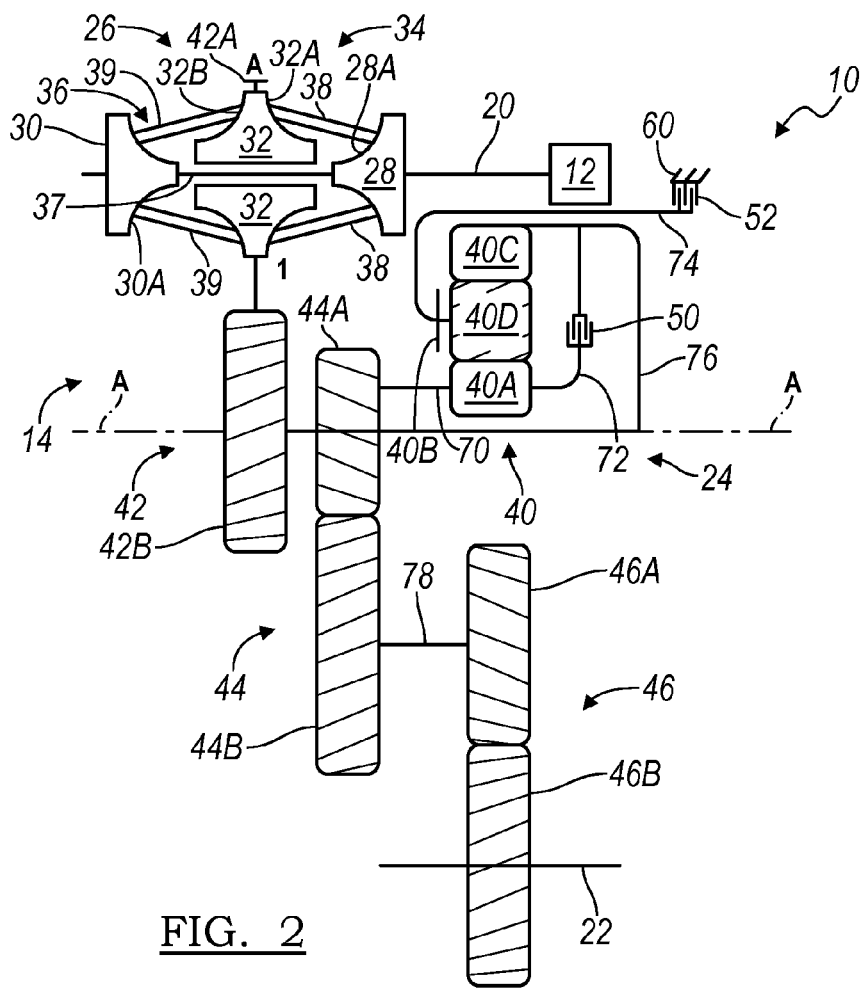

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is a lever diagram illustrating a single mode toroidal traction drive transmission in accordance with the principles the present invention; and FIG. 2 is a schematic diagram of a powertrain for a motor vehicle in accordance with the principles the present invention.

DETAILED DESCRIPTION

The following description is merely exemplary in nature and is not intended to limit the present disclosure, application, or uses.

Referring now to FIG. 1, an embodiment of a multi-speed transmission 10 is illustrated in a lever diagram format. A lever diagram is a schematic representation of the components of a mechanical device such as an automatic transmission. Each individual lever represents a pair of co-planar meshing gears or a planetary gear set wherein the basic mechanical components of the gear set are each represented by a node. In the case of a co-planar gear set having a pair of meshing gears, a single lever contains three nodes: one for the first gear, one attached to ground and one for the second gear. In the case of a planetary gear set, a single lever contains three nodes: one for the sun gear, one for the planet gear carrier and one for the ring gear. The relative length between the nodes of each lever can be used to represent the gear to gear or ring-to-sun ratios of each respective gear set. These lever ratios, in turn, are used to vary the gear ratios of the transmission in order to achieve appropriate ratios and ratio progression. Mechanical couplings or interconnections between the nodes of the various gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The powertrain 10 generally includes an engine 12 interconnected with a transmission 14. The engine 12 may be a conventional internal combustion engine or an electric motor, or any other type of prime mover, without departing from the scope of the present disclosure. The engine 12 supplies a driving torque to the transmission 14 through, for example, a flexplate or other connecting device or a starting device (not shown) such as a hydrodynamic device or launch clutch.

The transmission 14 is a toroidal-type continuously variable transmission (CVT). Generally speaking, the transmission 14 includes a transmission input shaft or member 20 and a transmission output shaft or member 22. Connected between the transmission input shaft 20 and the transmission output shaft 22 is a gearbox 24 configured to provide forward and reverse speed or gear ratios between the transmission input shaft 20 and the transmission output shaft 22 and a variator 26. The transmission input shaft 20 is functionally interconnected with the engine 12 and receives input torque or power from the engine 12. The transmission output shaft 22 is preferably connected with a final drive unit (not shown) which includes, for example, a propshaft, a differential assembly, and drive axles connected to wheels, etc. The transmission input shaft 20 is coupled to and provides drive torque to an input disk 30 of variator 26. The torque is transferred from input disk 30 to an output disk 32 of variator 26.

The gearbox 24 includes a planetary gear set 40, a first co-planar gear set 42, a second co-planar gear set 44, a third co-planar gear set 46 and a clutch 50 and a brake 52. The planetary gear set 40 includes a first node 40A, a second node 40B and a third node 40C. The first co-planar gear set 42 includes a first node 42A, a second node 42B and a third node 42C. The second co-planar gear set 44 includes a first node 44A, a second node 44B and a third node 44C. The third co-planar gear set 46 includes a first node 46A, a second node 46B and a third node 46C.

The first node 40A of the planetary gear set 40 is coupled to the first node 44A of the second co-planar gear set 44. The second node 40B of the planetary gear set 40 is selectively coupled to a ground or transmission housing 60 through brake 52. The third node 40C of the planetary gear set 40 is coupled to a second node 42B of the first co-planar gear set 42. The first node 42A of the first co-planar gear set 42 is in communication with the input disk 30 of variator 26. The second node 44B of the second co-planar gear set 44 is coupled to the first node 46A of the third co-planar gear set 46. The second node 46B of the third co-planar gear set 46 is coupled to the output shaft or member 22. Clutch 50 selectively interconnects the first node 40A of the planetary gear set 40 and the first node 44A of the second co-planar gear set 44 with the third node 40C of the planetary gear set 40 and the second node 42B of the first co-planar gear set 42.

Referring now to FIG. 2, a stick diagram presents a schematic layout of the embodiment of the multi-speed transmission 10 according to the present invention. In FIG. 2, the numbering from the lever diagram of FIG. 1 is carried over. The clutch, brake and couplings are correspondingly presented whereas the nodes of the planetary and co-planar gear sets now appear as components such as first and second gears, sun gear, ring gear, planet gears and planet gear carrier.

The first input disk 28 of variator 26 includes a toroidal outer surface or first input race 28A and the second input disk 30 includes a toroidal outer surface or second input race 30A. Disposed between the first and second input races 28A, 30A is an output disk 32. The output disk 32 includes a toroidal outer surface or first output race 32A and a toroidal outer surface or second output race 32B. The first output race 32A is disposed opposite the first input race 28A and the second output race 32B is disposed opposite the second input race 30A. The first input race 28A and the first output race 32A cooperate to define a first toroidal cavity 34 and the second input race 30A and the second output race 32B cooperate to define a second toroidal cavity 36. Each of the disks 28, 30, and 32 share a common rotational axis defined by a variator shaft 37. The variator shaft 37 is functionally interconnected to the transmission input shaft 20 and therefore receives drive torque from the engine 12. The input disks 28 and 30 are rotationally coupled to the variator shaft 37 and transfer drive torque to the output disk 32 via a plurality of rollers 38 and 39.

For example, the first cavity 34 includes the plurality of rollers 38 and second cavity 36 includes the plurality of rollers 39. Typically each of the first and second cavities 34 and 36 include two or three rollers 38 and 39, though it should be appreciated that any number of rollers may be employed without departing from the scope of the present invention. Each of the rollers 38, 39 are mounted for rotation about a roller axis and rolls upon the toroidal races 28A, 32A, 32B, and 30A of its associated input and output disks 28, 30, and 32 to transfer torque from the input disks 28 and 30 to the output disk 32. Changes in variator torque ratio are achieved by precession of the rollers 38, 39 such that the roller's axis is able to turn to change the inclination of the roller axis to the variator axis. Precession of the rollers 38, 39 results in changes of the radii of the paths traced upon the races 28A, 32A, 32B, and 30A by the rollers 38, 39 and hence results in a change of variator drive ratio between the input disks 28 and 30 and the output disk 32. The variator output disk 32 is coupled to first gear 42A of the first co-planar gear set 42.

The variator 26 is illustrated as a toroidal race rolling type variator. However, it should be appreciated that various other types of variators may be employed without departing from the scope of the present invention.

In the present embodiment, gearbox 24 includes planetary gear set 40. Planetary gear set 40 has a sun gear member 40A, a planet gear carrier member 40B and a ring gear member 40C. The sun gear member 40A is connected to a first shaft or interconnecting member 70 and a second shaft or interconnecting member 72. The planet gear carrier member 40B is coupled to a third shaft or interconnecting member 74 and rotatably supports a set of planet gears 40D configured to intermesh with both the sun gear member 40A and the ring gear member 40C. The ring gear member 40C is connected to a fourth shaft or interconnecting member 76.

First co-planar gear set 42 includes a first gear 42A and a second gear 42B. First gear 42A is in mesh with second gear 42B. In the instant embodiment, first gear 42A is the output disk 32 of the variator 26. Second gear 42B is connected to the fourth shaft or interconnecting member 76.

Second co-planar gear set 44 includes a first gear 44A and a second gear 44B. First gear 44A is in mesh with second gear 44B. In the instant embodiment, first gear 44A is connected to the first shaft or interconnecting member 70. Second gear 44B is connected to the fifth shaft or interconnecting member 78.

Third co-planar gear set 46 includes a first gear 46A and a second gear 46B. First gear 46A is in mesh with second gear 46B. In the instant embodiment, first gear 46A is connected to the fifth shaft or interconnecting member 78. Second gear 46B is connected to the output shaft or member 22.

A first torque transmitting member such as, for example, clutch 50 selectively couples the sun gear member 40A and first gear 44A of the second co-planar gear set 44 to ring gear member 40C and second gear 42B of the first co-planar gear set 42. A second torque transmitting member such as, for example, brake 52 selectively couples the third shaft or interconnecting member 74 to the stationary member or the transmission housing 60. In the particular implementation shown in FIG. 2, the clutch 50 is activated to engage a forward mode and the brake 60 is activated to engage a reverse mode of the transmission 14.

In the reverse mode, the brake 60 is engaged to hold the planet gear carrier member 40B stationary. Input torque is transmitted from the variator 26 through the first co-planer gear set 42 to the ring gear member 40C via the fourth shaft or interconnected member 76. Output torque is transmitted from the ring gear member 40C via planet gears 40D to sun gear member 40A connected to second coplanar gear set 44 via the first interconnecting shaft or member 70 and then to the third coplanar gear set 46 via the fifth interconnecting shaft or member 78. Brake 60 is configured as a band or plate clutch, in accordance with the present invention.

When the transmission 14 is operated in the forward mode, the clutch 50 is engaged to connect second gear 42B of the first co-planar gear set 42 and ring gear member 40C to the sun gear member 40A and first gear 44A of the second co-planar gear set 44. Input torque is transmitted from the variator 26 through the first co-planer gear set 42 to the ring gear member 40C via the fourth shaft or interconnected member 76. Output torque is transmitted from first gear 44A of the second co-planar gear set 44 to third coplanar gear set 46 via the first interconnecting shaft or member 70 and then to the third coplanar gear set 46 via the fifth interconnecting shaft or member 78.

A particularly beneficial feature of the gearbox 24 is that gearbox 24 has a reduced axial length along an axis "A" coincident with fourth interconnecting shaft or member 76. Hence, one can easily see that the use of the gearbox 24 greatly expands the packaging capability of the transmission over the use of conventional gearboxes. Moreover, the single simple planetary gear set 40 provided enables gearbox 24 to have a reduced mass and manufacturing cost as compared to conventional CVT transmissions. It will be clear, to those skilled in the art, that there are other ways to arrange gears and clutches to provide the necessary ratios after the variator.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission for a motor vehicle, the transmission comprising:
    an input member;
    an output member;
    a variator having an input coupled to the input member and an output;
    a first transfer gear set having a first gear coupled to the output of the variator and a second gear;
    a planetary gear set having a sun gear, a planet gear carrier member and a ring gear, wherein the ring gear of the planetary gear set is coupled to the second gear of the first transfer gear set;
    a friction brake configured to selectively couple the planet gear carrier member of the planetary gear set to a stationary member;
    a second transfer gear set having a first gear coupled to the sun gear of the planetary gear set and a second gear in mesh with the first gear of the second transfer gear set; and
    a friction clutch selectively engageable to interconnect the ring gear of the planetary gear set with the sun member of the planetary gear set, and
    wherein a plurality of forward speeds are established between the input member and the output member through manipulation of the variator.

2. The transmission for a motor vehicle of claim 1 wherein the friction brake selectively couples the planet gear carrier member of the planetary gear set to the stationary member.

3. The transmission for a motor vehicle of claim 1 wherein the friction clutch selectively connects the ring gear of the planetary gear set and the second gear of the first transfer gear set to the sun gear of the planetary gear set.

4. The transmission for a motor vehicle of claim 1 further comprising a first interconnecting member for continuously interconnecting the second gear of the first transfer gear set with the ring gear of the planetary gear set.

5. The transmission for a motor vehicle of claim 1 further comprising a second interconnecting member for continuously interconnecting the first gear of the second transfer gear set with the sun gear of the planetary gear set.

6. The transmission for a motor vehicle of claim 1 further comprising a third transfer gear set having a first and a second gear, and wherein a third interconnecting member continuously interconnects the second gear of the second transfer gear set with the first gear of the third transfer gear set.

7. The transmission for a motor vehicle of claim 1 further comprises a third transfer gear set having a first gear coupled to the second gear of the second transfer gear set and a second gear coupled to and driving the output member.

8. The transmission for a motor vehicle of claim 1 wherein the variator includes a pair of input discs, a pair of output discs and a pluralities of rollers disposed between the pairs of input and output discs.

9. A transmission for a motor vehicle, the transmission comprising:
    an input member;
    an output member;
    a variator having an input coupled to the input member and an output;
    a first transfer gear set having a first gear coupled to the output of the variator and a second gear;
    a planetary gear set having a sun gear, a planet gear carrier member and a ring gear, wherein the ring gear of the planetary gear set is coupled to the second gear of the first transfer gear set;
    a friction brake configured to selectively couple the planet gear carrier member of the planetary gear set to a stationary member;
    a second transfer gear set having a first gear coupled to the sun gear of the planetary gear set and a second gear in mesh with the first gear of the second transfer gear set; and
    a friction clutch selectively engageable to interconnect the ring gear of the planetary gear set with the sun member of the planetary gear set, and
    a third transfer gear set having a first gear coupled to the second gear of the second transfer gear set and a second gear coupled to and driving the output member.

10. The transmission for a motor vehicle of claim 9 wherein the friction brake selectively couples the planet gear carrier member of the planetary gear set to the stationary member.

11. The transmission for a motor vehicle of claim 9 wherein the friction clutch selectively connects the ring gear of the planetary gear set and the second gear of the first gear set to the sun gear of the planetary gear set.

12. The transmission for a motor vehicle of claim 9 further comprising a first interconnecting member for continuously interconnecting the second gear of the first gear set with the ring gear of the planetary gear set.

13. The transmission for a motor vehicle of claim 9 further comprising a second interconnecting member for continuously interconnecting the first gear of the second gear set with the sun gear of the planetary gear set.

14. The transmission for a motor vehicle of claim 9 further comprising a third interconnecting member for continuously interconnecting the second gear of the second gear set with the first gear of the third gear set.

15. The transmission for a motor vehicle of claim 9 wherein the variator includes a pair of input discs, a pair of output discs and a pluralities of rollers disposed between the pairs of input and output discs.

16. An automatic transmission for a motor vehicle, the automatic transmission comprising:
   an input shaft;
   an output shaft;
   a variator having an input coupled to and driven by the input shaft and an output;
   a first transfer gear set having a first gear coupled to and driven by said output of said variator and a second gear;
   a planetary gear set assembly having a sun gear, a planet gear carrier having a plurality of meshing planet gears and a ring gear;
   a friction brake configured to selectively couple the planet gear carrier of the planetary gear set assembly to a stationary member;
   a second transfer gear set having a first gear coupled to the sun gear of the planetary gear set assembly and a second gear operably driving the output shaft; and
   a friction clutch selectively engageable to interconnect the second gear of the first transfer gear set with sun gear of the planetary gear set assembly.

17. The automatic transmission for a motor vehicle of claim 16 further including a third transfer gear set having a first gear coupled to the second gear of the second transfer gear set and a second gear coupled to and driving an output shaft.

* * * * *